United States Patent [19]

Werronen

[11] Patent Number: 5,440,561
[45] Date of Patent: Aug. 8, 1995

[54] METHOD FOR ESTABLISHING FRAME SYNCHRONIZATION WITHIN A TDMA COMMUNICATION SYSTEM

[75] Inventor: Alton P. Werronen, Palatine, Ill.

[73] Assignee: Motorola, Inc., Schaumburg, Ill.

[21] Appl. No.: 767,726

[22] Filed: Sep. 30, 1991

[51] Int. Cl.$^6$ ................................................ H04J 3/06
[52] U.S. Cl. .................................. 370/105.1; 370/95.1; 455/56.1
[58] Field of Search .................. 370/105.1, 100.1, 103, 370/95.1, 95.3, 105.2–105.5, 106, 107, 108; 455/56.1, 51.1, 33.1–33.4, 54.1, 54.2; 375/106, 107, 114, 40, 38

[56] References Cited

U.S. PATENT DOCUMENTS

| | | | |
|---|---|---|---|
| 4,696,052 | 9/1987 | Breeden | 455/56.1 |
| 4,852,090 | 7/1989 | Borth | 370/104.1 |
| 5,228,029 | 7/1993 | Kotzin | 455/56.1 |

OTHER PUBLICATIONS

"Introduction of pseudo-synchronization" Matra Communication, France ETSI GSM/WP2, Copenhage, Jun. 1989.

Primary Examiner—Douglas W. Olms
Assistant Examiner—Dang Ton
Attorney, Agent, or Firm—Val Jean F. Hillman

[57] ABSTRACT

In a cellular TDMA communication system, prior to the handoff of a mobile unit (225) from a serving base-site (200) to a target base-site, (205 or 210), the target base-site (205 or 210) establishes frame synchronization with the serving base-site (200). In this effort, first, the serving base-site timing is determined. Next, a timing difference between the serving base-site timing and a target base-site timing is calculated. Thereafter, frame positions within the serving base-site TDMA traffic channels are identified as a function of the timing difference in order to establish frame synchronization. Armed with this information, target base-sites (205 and 210) can continuously monitor all serving base-site (200) traffic channels for respective RSSI values. Preserving this information in memory enables fast and accurate signal strength determinations upon handoff.

13 Claims, 3 Drawing Sheets

METHOD FOR ESTABLISHING FRAME SYNCHRONIZATION WITHIN A TDMA COMMUNICATION SYSTEM

FIELD OF THE INVENTION

The present invention relates generally to cellular radiotelephone communication systems, and more particularly to synchronization within a Time Division Multiple Access (TDMA) cellular radiotelephone communication system.

BACKGROUND OF THE INVENTION

In cellular radiotelephone communication systems, call handoffs are often required in order to maintain communication with mobiles as they move within the system. Handoff is the process whereby an in progress call is transferred from one RF coverage area (cell) to another, in coordination with a mobile's movements. It is also the process whereby a call is transferred to another channel within a cell because of interference within the cell. The process of handing off a call is one of the most delicately balanced functions relating to cellular radiotelephone systems and service because of the high level of synchronization required among various system processing elements.

In order to effectuate successful handoffs, current analog cellular systems continuously monitor the quality of every call throughout the system. The system must recognize when the quality of a call falls below a predetermined threshold and must then determine what other neighboring cell can most satisfactorily provide continued service. Once a more suitable cell is identified, the system sends instructions to the mobile, directing it to tune to a channel within the newly identified cell. The mobile confirms that it is leaving its current channel, tunes to the new channel, synchronizes to the new channel and begins transmitting.

In digital cellular radiotelephone systems, the procedure is modified somewhat in that the mobile measures channels in other cells as well as its current serving channel and reports these measurements, consisting of signal strength, back to the system. Since, the mobile cannot determine whether its measurements are as a result of interference, digital systems typically employ scan receivers to determine when a handoff, power change, or antenna change is required. This is done by measuring the mobile's signal strength as it moves within its currently serving cell. These measurements are taken by both the serving cell and adjacent cell scan receivers. Thereafter, the mobile's absolute signal strength is used to determine when a power change is required. The relative signal strength among the base site's antennas determines when an antenna change is required, and the relative signal strength between base sites is used to determine when a handoff is required.

Unlike the analog counterpart, digital mobiles do not continuously transmit. Thus, in a TDMA system, characterized by the shared allocation of resources, it is necessary for adjacent cell scan receivers to know when the candidate mobile is transmitting in order to make accurate signal strength measurements. If all cells within the TDMA system are synchronized, adjacent cell scan receivers can readily determine when to make such measurements based upon adjacent cell local timing.

By synchronized, it is meant that the timing within each cell is substantially identical. In the case of time-shared channels, where the information is organized into blocks or frames of some uniform number of symbols, synchronization pertains to frame synchronization. Frame synchronization is equivalent to being able to generate a square wave at a frame rate, with the zero crossings coincident with the transitions from one frame to the next.

Unfortunately, synchronization within any communication system implies cost to the system. The most obvious cost is in the need for additional hardware and/or software required for data acquisition. Less obvious costs lie in the extra time required to achieve synchronization prior to communications. In light of these factors, the typical TDMA communication system is not synchronized and therefore susceptible to various timing errors and delays.

During normal radiotelephone communications, these timing anomalies typically go unnoticed. During handoffs, however, even minor timing errors or delay may result in the failure to hand a call off at the proper time. This type failure is readily recognizable to the system subscriber and is typically characterized by reduced call quality, interference with neighboring coverage areas or even the undesired termination of the call.

It would be extremely advantageous, therefore, to provide within a TDMA communication system, a method for determining frame synchronization.

SUMMARY OF THE INVENTION

Briefly described, the present invention is a method for for establishing frame synchronization between a serving base-site and an adjacent base-site within a TDMA communication system. In this effort, first, a determination of the currently serving base-site timing is made. Next, a timing difference between the serving base-site's timing and the adjacent base-site's timing is calculated. Thereafter, frame positions within serving base site TDMA channels are identified as a function of the timing difference in order to establish frame synchronization.

DESCRIPTION OF A PREFERRED EMBODIMENT

Figure 1:
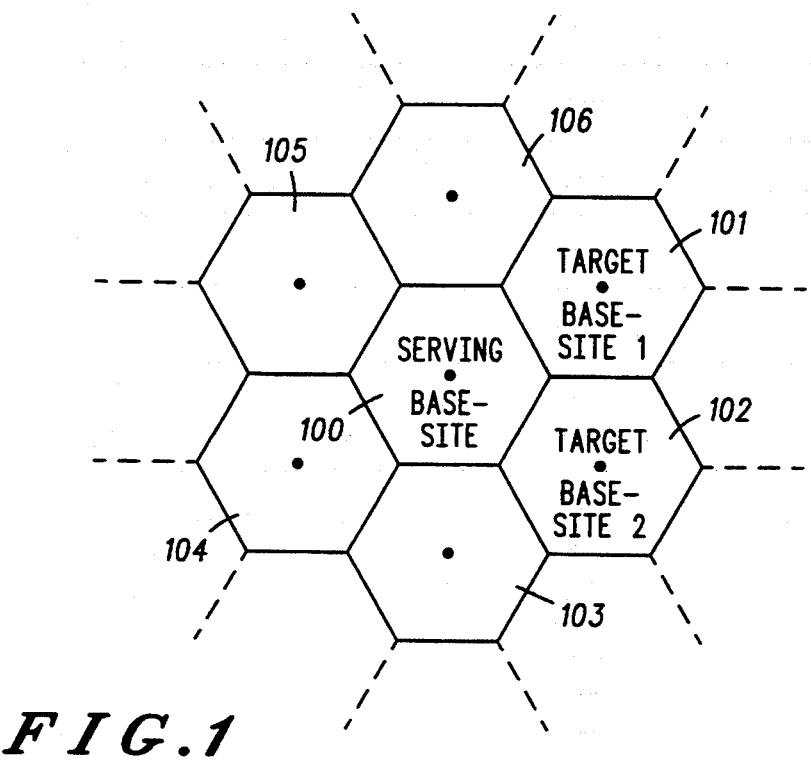
FIG. 1 depicts a geographic layout of a cellular TDMA communication system.

FIG. 1 depicts a portion of the geographic configuration of a typical cellular TDMA radiotelephone communication system, consisting of cellular radio service areas (cells) 100–106. A serving cell 100 is bounded by adjacent target cells 101–106, each equipped with one or more RF transceivers, hereinafter referred to as base-sites. The serving cell 100 receives its designation because it is communicating with a mobile unit that is travelling within the geographic boundaries of that particular cell. It will be appreciated therefore, that any cell within the system may be termed serving and/or target, depending upon its relationship to a particular mobile unit. The same convention applies to the base-sites within each cell.

Figure 2:
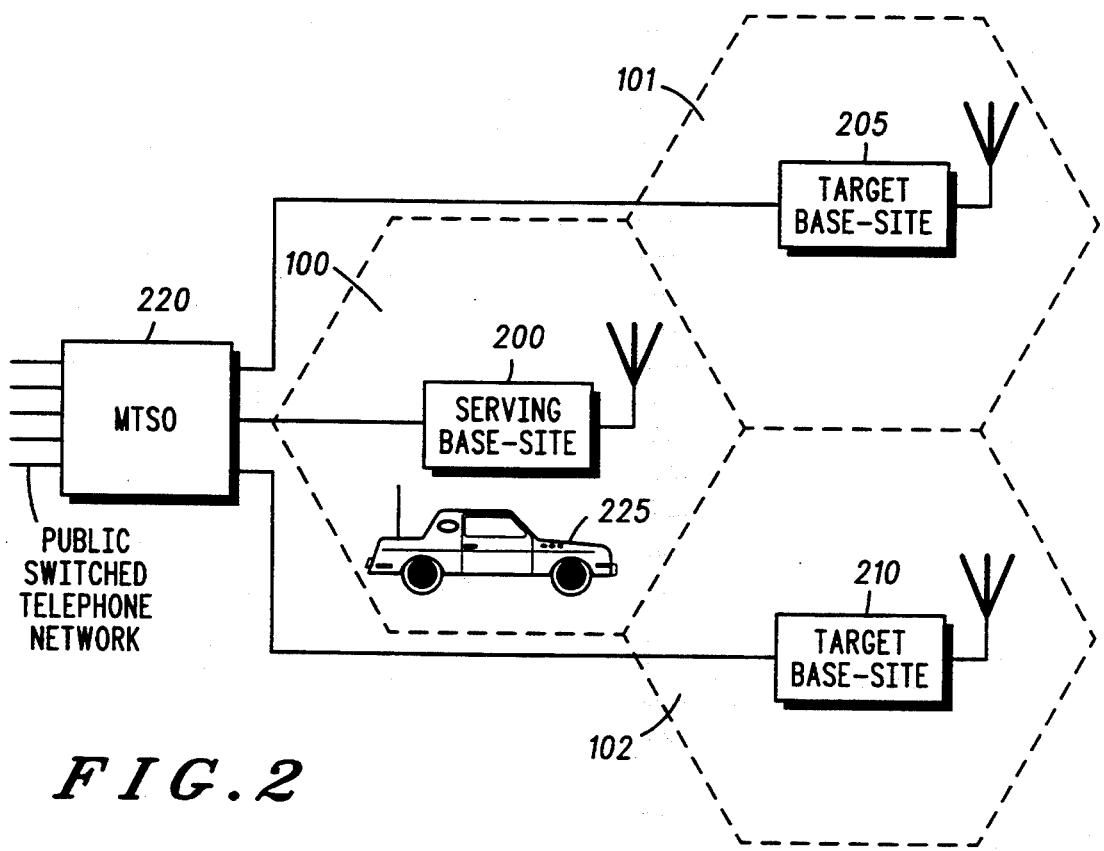
FIG. 2 depicts a candidate mobile unit communicating to a serving base-site and moving toward two adjacent target base-sites.

FIG. 2 shows an expanded view of the serving cell 100 and adjacent target cells 101 and 102. As is conventional, serving base-site 200 and target base-sites 205 and 210 are interconnected and controlled by a Mobile Telephone Switching Office (MTSO) or switch 220. In turn, the MTSO interfaces with the public switched telephone network (PSTN) and with other MTSOs within the TDMA system. During operation, the mobile unit 225 establishes RF communications with the serving base-site 200 of cell 100, as it moves towards target cells 101 and 102. The serving base-site 200 couples to the MTSO 220 via dedicated facilities, whereby the MTSO provides the mobile unit 225 with switched communications with other mobiles within the system or switched communications with the PSTN.

A complete description of the fixed and mobile hardware and software necessary to implement the TDMA system of FIGS. 1 and 2 is well documented and well within the knowledge of those skilled in the art and will not, therefore, be provided at this time. Interested readers may, however, refer to "DYNA T.A.C. TM Systems description." Instructional Manual 68P81150E01-A, available from Motorola Inc., Technical Writing Services, 1301E. Algonquin Rd, Schaumburg Ill., 60196, hereby incorporated by reference.

Suffice it to say, however that each MTSO comprises a software-driven, computer-controlled telephony switch that performs functions including but not limited to:

providing communication and signalling connections between the TDMA communication system and the PSTN, providing signalling data communication connections with other elements of the TDMA communication system, providing communication and signalling connections between the MTSO and mobile subscribers (commonly referred to as the Air Interface), via RF means, administering the usage of RF channels available to the associated radio service area, recording billing information, and providing control over the "handoff" of calls between cells.

Due to the TDMA protocol, a mobile unit utilizes only a very small portion of a serving channel's resources at any given time. Therefore, a method for informing a target base-site when to scan for a transmitting mobile unit is necessary in order to permit signal strength measurement and verification.

Figure 3:
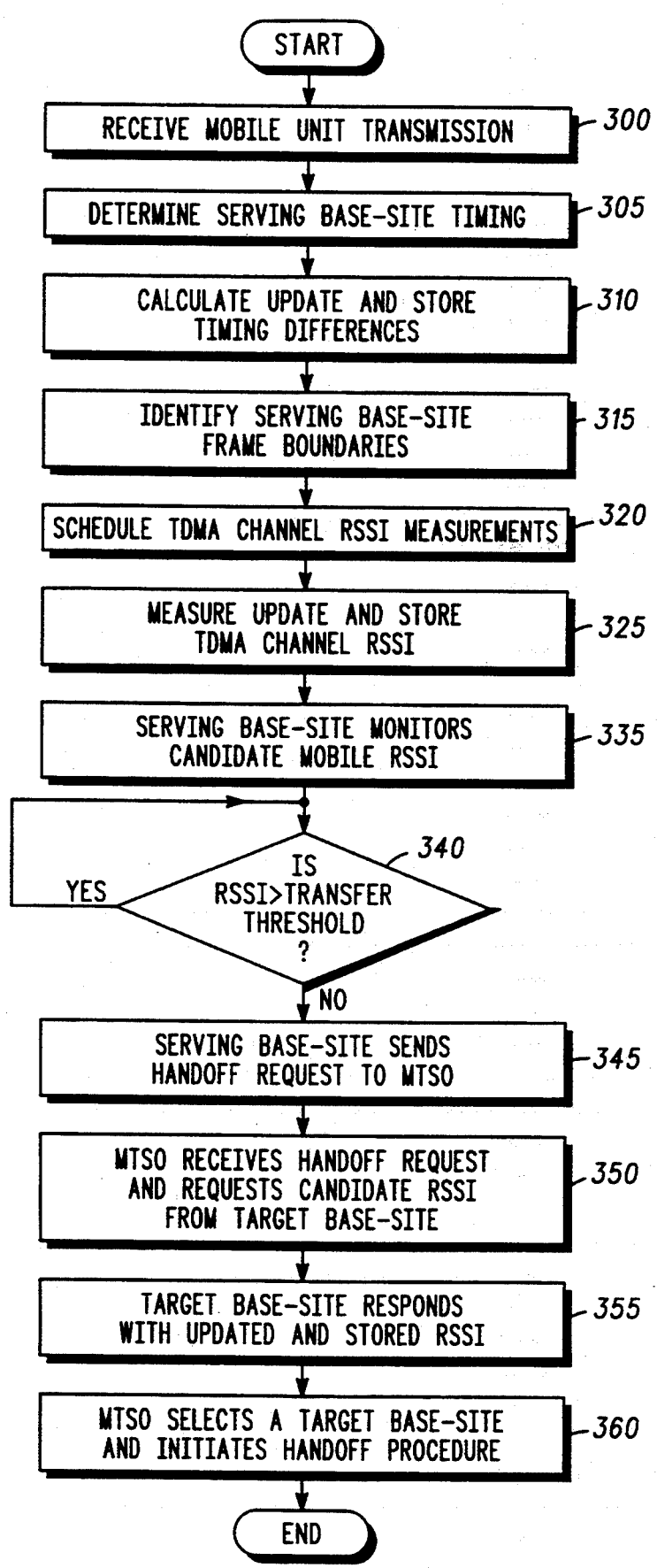
FIG. 3 is a flow chart diagram depicting the steps involved in establishing frame synchronization between the serving base-site and an adjacent target base-site in accordance with the present invention.

FIG. 3, depict a flow chart diagram of the steps involved in establishing frame synchronization between a target base-sites 205 and and the serving base-site 200. Upon frame synchronization, the target base-site 205 can readily determine when to scan for the mobile unit 225 in preparation for a handoff. In accordance with a preferred embodiment, frame synchronization is established between all adjacent cells of the system, thereby permitting the scanning of every TDMA traffic channel. Preserving and updating this information in memory provides a fast and accurate method of making signal strength determinations. When used in preparation for handoffs, substantial time savings are realized by this method which measures and stores mobile unit signal strength levels in memory, prior to the issuance of a handoff request.

Referring to FIG. 3, the procedure commences at block 300 where target base-sites 205 and 210 receive transmissions from mobile unit 225. In the present example, the mobile unit 225 happens to be the candidate mobile, i.e. that mobile in anticipation of handoff. It will be appreciated by those skilled in the art, however, that the transmissions received at block 300 may be from any mobile unit serviced by the serving base-site 200 and engaged in an active call. All mobile units serviced by the serving base-site 200 share the same timing reference, i.e., the serving base-site local timing.

Flow proceeds to block 305, where the serving base-site timing is determined. In accordance with the preferred embodiment, serving base-site timing is established by either synchronization signal pattern detections or digital verification color code detections.

In most radio communication systems, for example, the digital cellular radiotelephone communication system for use in the United States as described in the document EIA/TIA Interim Standard IS-54: "Cellular System Dual-Mode Mobile Station/Base Station Compatibility Standard" May 1990, the frame and time slot structures of a TDMA traffic channel are well defined.

Figure 4A:
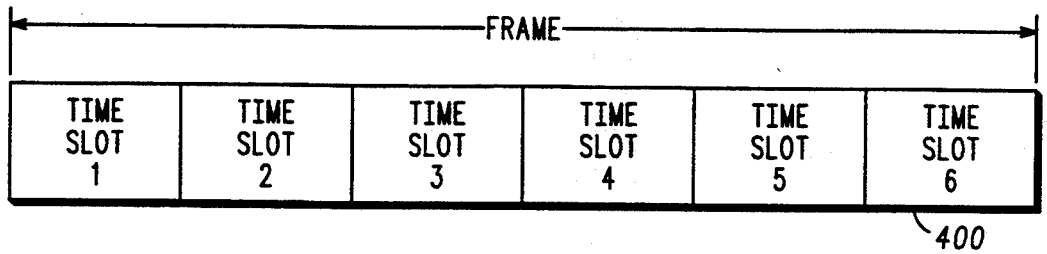
FIGS. 4A and 4B respectively depict the TDMA traffic channel and TDMA uplink time slot structures, in accordance with the present invention.

FIG. 4A depicts the structure of a TDMA traffic channel. Referring to FIG. 4A, it will be appreciated that a TDMA traffic channel is divided into blocks of data, hereinafter referred to as frames. As depicted, frame 400 consists of 6 equal time slots numbered 1–6. In accordance with the preferred embodiment each time slot 1–6 consists of 324 bits which are transmitted at a rate of 48.6 kilobits/second. Therefore, the frame 400 transmission rate is 25 frames per second or 1 frame every 40 msec.

Figure 4B:
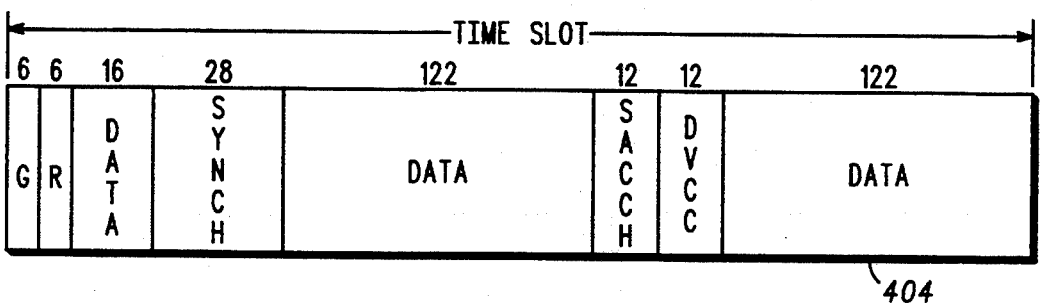

FIG. 4B depicts the structure of one of the time slots within the traffic channel of FIG. 4A. Referring to FIG. 4B, the data field structure of an uplink (mobile to base-site) time slot is shown. While 260 of the uplink time slot bits are available for actual data transmission (DATA), the rest are used to assist reception and detection of the signal. For example, a 28 bit training sequence near the beginning of each uplink time slot, referred to as the synchronization signal pattern (SYNCH), is used to synchronize the receiver's operation to that of a transmitter. 12 bits near the end of each time slot provide a digital verification color code (DVCC) field. The DVCC is used to identify a particular traffic channel within the digital system, thereby distinguishing a current traffic channel from traffic co-channels. An additional 12 bits comprise the Slow Associated Control Channel (SACCH) which provides control signaling between the mobile and a serving base-site. Finally, there are 6 Guard time (G) and 6 Ramp time (R) bits at the beginning of each uplink time slot which provide contention reduction and transmitter power up time, respectively.

As previously mentioned, the present invention utilizes the detection of the synchronization signal pattern (SYNCH) or the detection of the digital verification color code (DVCC) to determine serving base-site timing. Serving base-site timing comprises ascertaining where the frame boundaries or transitions lie within a serving base-site's traffic channel structure. Frame boundaries are determined by identifying the 6 intermediate time slot positions. Since the SYNCH and DVCC fields comprise known data having defined bit locations within a TDMA traffic channel, they are used by the present invention as timing stamps. The subsequent detection, by a target base-site, of SYNCH and/or DVCC within a serving base-site time slot, provides a clear indication of the serving base-site timing.

For example, each time slot has a unique SYNCH field code which identifies the time slot's number. Upon the detection of the 28 bit SYNCH field identifying that slot as time slot 1-6, all other portions of the time slot are immediately decipherable. Referring back to FIG. 4B, it will be appreciated that the 16 bits prior to the SYNCH field comprise transmission data. The 12 bits prior to that DATA field comprise 6 ramp time (R) and 6 guard time (G) bits. Thus, 28 bits prior to the SYNCH field is a time slot begin boundary, while 268 bits after the SYNCH field is the time slot end boundary. Similarly, upon the detection of a 16 bit DVCC field, the following 122 bits comprise transmission data, immediately followed by the time slot's end boundary. 190 bits prior to the DVCC field is the time slot's begin boundary. This identification process will continue as each of the 6 time slots comprising a frame are identified. It will be appreciated therefore, that knowledge of the TDMA traffic channel and time slot structures, as well as the 6 unique SYNCH and DVCC field positions within those structures, enables the present system to determine serving base-site timing upon SYNCH and/or DVCC detections.

SYNCH and DVCC detections are required on a time slot-by-time slot basis in order to assure proper data acquisition. Accordingly, SYNCH and DVCC detection methods, such as but not limited to correlation, are well documented and well within the knowledge of those skilled in the art and will not be discussed at this time.

In a non-synchronous TDMA system, serving base-site 200 timing, while consistent throughout the serving cell 100, will tend to differ when viewed from different adjacent target cells. In accordance with the preferred embodiment, it is therefore necessary to determine the serving base-site 200 timing from each adjacent cell 101-106. This information may be passed to the MTSO for storage and subsequent retrieval. Else, the timing may be maintained and updated by each individual adjacent base-site, respectively. It will be appreciated that if the serving base site's timing has not heretofore been established, it will be necessary to monitor traffic channels for at least an entire frame i.e. 40 msec. If previously determined, however, shorter monitoring periods may be sufficient. Since every cell or base-site within the TDMA system can be designated serving, it is possible to determine the timing of every cell in this fashion.

Armed with the various serving base-site times, flow proceeds to block 310 where a timing difference between a serving base-site and its adjacent base-sites is calculated, updated and stored.

As previously suggested, a base-site's timing is a function of the frame boundary locations within that base-site's traffic channel structure. By comparing serving base-site frame boundary locations, as viewed from an adjacent base-site, with that adjacent base-site's respective timing, an offset or timing difference is calculated. As previously suggested, frame boundaries are a function of time slot identifications, which according to the preferred embodiment, are achieved via SYNCH and-/or DVCC detections. Since SYNCH and DVCC detections are required on a time slot-by-time slot basis, several such timing difference calculations can be made. Summing the differences together and dividing by the number of differences summed provides the system with a means for tracking and updating the timing difference between a serving and an adjacent target base-site.

Since any cell or base-site within a TDMA communication system can be designated serving and/or target, it is possible to calculate and update timing differences between each adjacent cell within the system. By continuously updating these various timing difference values and storing them in memory, the timing difference between any two adjacent cells is now readily available. Armed with these timing difference values, flow proceeds to block 315 where frame boundaries within an adjacent/target base site traffic channel are identified in order to achieve frame synchronization.

Within the non-synchronous TDMA system of the present invention, it will be appreciated that frame positions from cell to cell will be offset in time. Fortunately, these offsets correspond to the timing differences calculated and stored at block 310. It is therefore possible to identify the frame boundaries within one cell from a neighboring cell, after a determination of the timing difference between the two.

Figure 5:
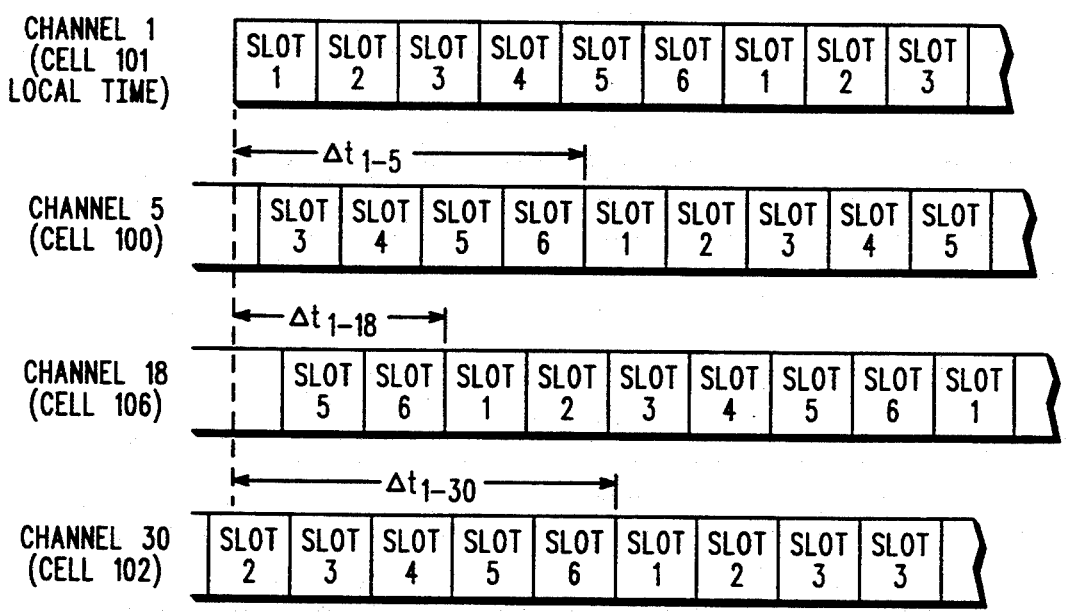
FIG. 5 depicts a plurality of TDMA traffic channels and the method for determining frame synchronization in accordance with the present invention.

Referring to FIG. 5, a plurality of non-synchronized TDMA traffic channels are presented. For the purpose of this discussion, channel 1 is a traffic channel within the target cell 101, channel 5 is a traffic channel within the serving cell 100, while channels 18 and 30 depict the traffic channel timing within adjacent cells 106 and 102, respectively. Note how none of the time slot or frame transitions (boundaries) within the depicted traffic channels line up with each other. It can be inferred, therefore, that the depicted traffic channels 1, 5, 18 and 30 are all from different base-sites.

Since all channels at each base-site share the same timing, there are only as many timing differences, for a single cell, as there are adjacent cells. For, example, referring to FIG. 1, target cell 101 has 3 adjacent cells 100, 106 and 102. Thus, 3 timing differences must be calculated updated and stored for target cell 101. Conversely, if cell 100 were the target cell in question, 6 timing differences would require monitoring.

Since the target base-site 205 is attempting to establish frame synchronization with its adjacent base-sites, the timing within target cell 101 will be referred to as the local time. It will be appreciated that the digital scan receivers within target cell 101 operate off this same time, thereby knowing when to scan for mobiles operating within the cell. In preparation for handoff, however, the target cell 101 scan receivers must monitor mobile transmissions within the adjacent cells. It is therefore necessary for target cell 101 scan receivers to know each adjacent cells timing in order to know when to make said signal strength measurements.

Referring to FIG. 5, since the timing difference between channel 1's time slot 1 and channel 5's time slot 1 is known, the frame boundaries within channel 5 can be approximated by adding the updated timing difference $\Delta^t$ 1-5 to cell 101 timing. $\Delta^t$ 1.5 represents the timing difference between channel 1 timing and channel 5 timing. It will be appreciated by those skilled in the art that $\Delta^t$ 1-5 also represents the timing difference between cells 100 and 101. To establish frame synchronization between cell 101 and the remaining adjacent cells 102 and 106, it is merely a matter of adding the appropriate timing difference $\Delta t1-18$ and $\Delta t1-30$ to the cell 101 timing, respectively.

Since the timing differences between every adjacent cell within the TDMA system is calculated, updated and stored at block 310, flow proceeds to block 320 where received signal strength indication (RSSI) measurements for all TDMA channels within the entire communication system are scheduled. The measurements that need to be scheduled consist of signal strength measurements and SYNC and/or DVCC verifications. The signal strength measurements are used to determine if a mobile should indeed be handed off. The SYNC/DVCC measurements are used to determine if the desired mobile or a co-channel interferer is being measured. SYNC and/or DVCC measurements are also used to update an adjacent base site's timing offset as will be described below.

Signal strength measurements are spaced in time to minimize correlation between samples. A typical measurement algorithm would consist of 4 signal strength measurements and a DVCC verification spaced to avoid correlation between the samples. According to the preferred embodiment, 8 signal strength and a SYNC/DVCC detection spaced at least 80 msec apart, are performed in a period of 2 sec. These measurements can be interleaved with measurements of other traffic channels as continuous monitoring of a given traffic channel is not required.

According to the preferred embodiment, DVCC measurements are scheduled first. The scheduling of DVCC is more stringent than signal strength scheduling. It does not matter where in a time slot signal strength samples are taken, DVCC on the other hand can only be measured at a specific time slot location. In accordance with this method, signal strength measurements are grouped in 120 msec periods. DVCC measurements are grouped in their own 120 msec periods. 120 msec was chosen because it is a multiple of the frame rate (40 msec), and it allows time for at least 8 signal strength measurements to be made for each traffic channel.

A scheduler, armed with the various cell timing differences and slot positions, calculates when serving base-site traffic channels can be measured. In accordance therewith the scheduler will successively look through the entire list of traffic channels on which to verify DVCC and choose the one that minimizes the unused time between the previously scheduled verification and the verification currently being scheduled. If the traffic channel can be measured for DVCC, the scheduler will schedule that traffic channel for measurement. If that traffic channel can not be measured at that point in the sequence, the next traffic channel will be checked to see if it will fit in the sequence. Remaining traffic channels will be scheduled in subsequent frames. Since DVCC verification require more time than do signal strength measurements, each traffic channel's DVCC will be verified only once every 2 sec. Signal strength measurements are scheduled utilizing a similar approach, except 8 signal strength samples are taken in every 2 sec period.

While scheduling is described herein with reference to a preferred embodiment it will be appreciated by those skilled in the art that other scheduling schemes may be employed without departing from the spirit of the present invention. For example, non-interleaved scheduling or scheduling based upon the Viterbi algorithm.

At block 325 all TDMA channels within the system are measured for RSSI levels. Thereafter, these measurements are updated and stored in memory. Updating includes making additional strength measurements for each traffic channel and taking a weighted average of these samples with the current average to determine a new average RSSI level. These traffic channel measurements are repeated and updated on a on a periodic basis.

While updating is described herein with reference to a preferred embodiment it will be appreciated by those skilled in the art that other updating schemes may be employed without departing from the spirit of the present invention. For example, block averaging.

Updated and stored RSSI values for each traffic channel are employed to assist the TDMA system during a handoff. In accordance therewith, the serving base-site 200 at block 335, monitors the candidate mobile unit 225 for RSSSI. This measure is typically stored as a signal quality indication. A test is then performed at block 340 to determine if the mobile's RSSI is greater than a predetermined transfer threshold. If the value of RSSI is greater than the threshold, flow branches back to block 335 where the serving base-site 200 continues to monitor and store the mobile's RSSI. If the value of RSSI falls below the transfer threshold, however, flow proceeds to block 345, where the serving base-site 200 sends a handoff request to the MTSO 220.

In the typical cellular radiotelephone system, the MTSO 220 receives a handoff request from the serving base-site 200 at block 350 and relays a message to potential target base-sites 205 and 210. Each target base-site will then monitor the quality of transmission of the mobile unit 225 and if required conditions are met, respond back to the MTSO that it is a potential candidate. Thereafter, the MTSO will select a target base-site from the replies received.

In accordance with the present invention, however, each target base-site, at block 355, responds back to the MTSO with the appropriate RSSI value stored in memory. Compiling traffic channel RSSI values in memory, prior to the generation of handoff requests, enables target base-sites 205 and 210 to immediately respond to the MTSO, without first performing several asynchronous scans in order to determine signal strength levels. At block 360, the MTSO will select a target base-site based upon the replies received, and initiate a handoff procedure. It will be appreciated by those skilled in the art, however, that a substantial time savings is recognized. In particular, the time saved not waiting for target base-sites 205 and 210 to perform the requested signal strength measurements.

What is claimed is:

1. A method for establishing frame synchronization between a serving base-site and an adjacent base-site within a TDMA communication system comprising the steps of:

said adjacent base-site determining serving base-site timing relative to adjacent base-site timing by:
identifying at least one mobile unit serviced by the serving base-site, said mobile unit engaged in an active call;
receiving at least some of the mobile unit's transmission signals; and
processing the received signals to determine the serving base-site timing;
calculating a timing difference between the serving base-site timing and the adjacent base-site timing; and said adjacent base-site identifying frame boundaries within a serving base-site TDMA traffic channel utilizing the timing difference.

2. The method according to claim 1 wherein the step of processing further comprises at least one of the following sets of steps:

said adjacent base-site detecting a synchronization signal pattern within the mobile unit's RF communication signals, and said adjacent base-site identifying time slot positions within a serving base-site TDMA channel as a function of the synchronization signal pattern detection; and said adjacent base-site detecting a digital code within the mobile unit's RF communication signals, and said adjacent base-site identifying time slot positions within a serving base-site TDMA channel as a function of the digital code detection.

3. The method of claim 1 wherein the step of identifying frame boundaries comprises the step of approximating frame positions as a function of time slots identified within the serving base-site TDMA channel.

4. The method of claim 1 wherein the step of identifying frame boundaries further comprises the step of adding the timing difference to the adjacent base-site timing.

5. A method for establishing frame synchronization between a serving base-site and a plurality of adjacent base-sites in a TDMA communication system, prior to the handoff of a candidate mobile unit, said method comprising the steps of:

receiving, at the plurality of adjacent base-sites, radio frequency (RF) transmissions from at least one mobile unit serviced by the serving base-site, said mobile unit engaged in an active call;

determining, at each of said adjacent base-sites, serving base-site timing, as a function of time slots identified within the received RF transmissions;

calculating, for said each of said adjacent base-sites, a timing difference, said timing difference being the difference between the serving base-site timing established at an adjacent base-site and that adjacent base-site's timing;

updating said each of said adjacent base-site's timing difference;

identifying frame boundaries within a serving base-site TDMA traffic channel as a function of an updated timing difference; and scheduling serving base-site signal strength measurements from said each of said adjacent base-site utilizing the updated timing difference.

6. The method of claim 5 wherein said serving base-site timing and time slot identifications are determined as a function of at least one of:

synchronization signal pattern detection; and
digital code detection.

7. The method of claim 5 further comprising the steps of:

measuring all serving base-site TDMA traffic channels for signal strength levels;

updating each traffic channel's signal strength level; and storing each traffic channel's updated signal strength level in memory.

8. The method according to claim 7 further comprising the step of scanning and measuring all serving base-site TDMA traffic channels from adjacent base-site scan receivers.

9. The method according to claim 7 wherein the step of updating said each traffic channels signal strength level comprises the steps of:

obtaining a number of signal strength samples over a predetermined period;

summing the number of signal strength samples together; and dividing the signal strength sum by the number of samples in order to obtain an updated signal strength level.

10. The method of claim 5 further comprising the steps of:

scanning and measuring all TDMA traffic channels within the TDMA communication system for signal strength levels;

storing the signal strength levels in memory;

updating the stored signal strength levels; and retrieving an updated signal strength level from memory, when a candidate mobile unit requires a handoff.

11. The method according to claim 10 wherein the step of updating stored signal strength level comprises the steps of:

obtaining at least 4 signal strength samples over a two second period;

summing the 4 signal strength samples together; and dividing the signal strength sum by 4 in order to obtain an updated signal strength level.

12. The method of claim 5 wherein the step of identifying frame boundaries further comprises the step of adding the updated timing difference obtained for an adjacent base-site to that base-site's respective timing.

13. A method for establishing frame synchronization between a serving base-site and a plurality of adjacent base-sites in a TDMA communication system, prior to the handoff of a candidate mobile unit, said method comprising the steps of:

receiving, at the plurality of adjacent base-sites, radio frequency (RF) transmissions from at least one mobile unit serviced by the serving base-site and engaged in an active call;

determining, at each adjacent base-site, serving base-site timing, as a function of time slots identified within the received mobile's RF transmissions;

calculating, for said each of said adjacent base-sites, a timing difference, said timing difference being the difference between the serving base-site timing established at an adjacent base-site and that adjacent base-site's timing;

updating said each of said adjacent base-site's timing difference;

identifying frame boundaries within a serving base-site TDMA traffic channel as a function of an updated timing difference;

scheduling serving base-site signal strength measurements from said each of said adjacent base-site as a function of the updated timing difference;

measuring all serving base-site TDMA traffic channels for signal strength levels;

updating each traffic channel's signal strength level;

storing said each traffic channel's updated signal strength level in memory; and retrieving an updated signal strength level from memory, when a candidate mobile unit requires a handoff.

* * * * *